(12) United States Patent
Oh et al.

(10) Patent No.: US 10,296,756 B2
(45) Date of Patent: May 21, 2019

(54) APPARATUS AND METHOD FOR CONTROLLING SECURITY OF ELECTRONIC DEVICE

(71) Applicant: Samsung Electronics Co., Ltd., Gyeonggi-do (KR)

(72) Inventors: Youngil Oh, Gyeonggi-do (KR); Hankyung Jeon, Gyeonggi-do (KR); Minwook Na, Gyeonggi-do (KR); Sung-Jin Yoon, Gyeonggi-do (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 181 days.

(21) Appl. No.: 15/215,852

(22) Filed: Jul. 21, 2016

(65) Prior Publication Data
US 2017/0032140 A1 Feb. 2, 2017

(30) Foreign Application Priority Data
Jul. 30, 2015 (KR) .................. 10-2015-0107750

(51) Int. Cl.
- *G06F 7/04* (2006.01)
- *G06F 21/62* (2013.01)
- *G06F 3/0488* (2013.01)
- *G06F 21/36* (2013.01)

(52) U.S. Cl.
CPC ...... *G06F 21/6218* (2013.01); *G06F 3/04883* (2013.01); *G06F 21/36* (2013.01)

(58) Field of Classification Search
CPC .. G06F 21/36; G06F 21/6218; G06F 3/04883; G06F 3/0487; G06F 21/30

USPC ............................................................ 726/18
See application file for complete search history.

(56) References Cited

U.S. PATENT DOCUMENTS

| | | | | |
|---|---|---|---|---|
| 8,624,841 B2* | 1/2014 | Kim | ........ | G06F 3/04886 345/168 |
| 9,710,639 B1* | 7/2017 | Saini | ........ | G06F 21/36 |
| 9,772,738 B2* | 9/2017 | Na | ........ | G06F 3/048 |
| 2012/0069231 A1* | 3/2012 | Chao | ........ | G06F 3/04883 348/333.01 |
| 2012/0133484 A1* | 5/2012 | Griffin | ........ | G06F 21/51 340/5.54 |
| 2013/0113723 A1* | 5/2013 | Chen | ........ | G06F 21/30 345/173 |
| 2013/0227450 A1* | 8/2013 | Na | ........ | G06F 3/048 715/764 |
| 2013/0234971 A1* | 9/2013 | Li | ........ | G06F 3/04883 345/173 |
| 2013/0235704 A1* | 9/2013 | Grinberg | ........ | G04G 21/08 368/69 |
| 2013/0321305 A1* | 12/2013 | Liang | ........ | G06F 3/04883 345/173 |

(Continued)

*Primary Examiner* — Samson B Lemma
(74) *Attorney, Agent, or Firm* — Cha & Reiter, LLC.

(57) ABSTRACT

An electronic device comprising: a touch screen display; and at least one processor operatively coupled to the touch screen display, configured to: detect an input on the touch screen display; identify an input range based on a location of the input; detect a first path associated with additional input that is performed at least partially in the input range and display an indication of the first path on the touch screen display; compare the first path to a second path; and perform a function in response to detecting that the first path matches the second path.

20 Claims, 23 Drawing Sheets

(56) References Cited

U.S. PATENT DOCUMENTS

| | | | |
|---|---|---|---|
| 2014/0066017 A1* | 3/2014 | Cho | H04M 1/72519 455/411 |
| 2014/0145990 A1* | 5/2014 | Ho | G06F 3/0484 345/173 |
| 2015/0193553 A1* | 7/2015 | Petersen | G06F 21/00 235/375 |
| 2015/0244772 A1* | 8/2015 | Stalman | H04L 67/10 709/203 |
| 2015/0324041 A1* | 11/2015 | Varley | G06F 3/0412 345/173 |
| 2016/0042172 A1* | 2/2016 | Chiplunkar | G06F 21/36 726/19 |
| 2016/0103538 A1* | 4/2016 | Cheng | G06F 3/0412 345/173 |
| 2016/0162116 A1* | 6/2016 | Kuge | G06F 3/0418 345/173 |
| 2017/0032140 A1* | 2/2017 | Oh | G06F 21/6218 |
| 2017/0115736 A1* | 4/2017 | Patel | G06F 3/017 |

* cited by examiner

APPARATUS AND METHOD FOR CONTROLLING SECURITY OF ELECTRONIC DEVICE

CLAIM OF PRIORITY

The present application claims priority under 35 U.S.C. § 119 to an application filed in the Korean Intellectual Property Office on Jul. 30, 2015 and assigned Serial No. 10-2015-0107750, the contents of which are incorporated herein by reference.

BACKGROUND

1. Technical Field

The present disclosure relates to electronic devices, in general, and more particularly to an apparatus for controlling security of an electronic device.

2. Description of the Related Art

With the recent development of digital technology, various kinds of electronic devices, such as mobile communication terminals, smart phones, tablets, Personal Computers (PCs), Personal Digital Assistants (PDAs), electronic schedulers, notebooks, wearable devices, and the like, are widely used. The electronic devices have evolved to reach a mobile convergence stage encompassing the functions of the other devices. For example, the electronic devices are able to provide a telephony function such as a voice call, a video call, etc., a message exchange function such as a short message service (SMS)/multimedia message service (MMS), an electronic mail, etc., an electronic scheduler function, a photographing function, a broadcast replay function, a video replay function, a music replay function, an Internet function, a messenger function, a game function, or a social networking service (SNS) function, etc.

An unlocking method of an electronic device displays a pattern input area on a fixed area in a screen lock state, recognizes an input pattern which is inputted by touching the displayed pattern input area, and determines whether to unlock the screen. However, the user of the electronic device should use both hands to input a pattern to the pattern input area displayed on the fixed location, and thus has difficulty in inputting a pattern with one hand. In addition, since the lock screen is displayed on the first screen, the lock screen may hide the screen (wall paper) (visual noise), and accordingly, may increase screen complexity. In addition, when the pattern input area is not displayed on the first screen, depth may be generated and thus much time may be required to perform an operation desired by the user (an unlocking operation).

SUMMARY

According to aspects of the disclosure, an electronic device is provided comprising: a touch screen display; and at least one processor operatively coupled to the touch screen display, configured to: detect an input on the touch screen display; identify an input range based on a location of the input; detect a first path associated with additional input that is performed at least partially in the input range and display an indication of the first path on the touch screen display; compare the first path to a second path; and perform a function in response to detecting that the first path matches the second path.

According to aspects of the disclosure, method is provided for use in an electronic device, the method comprising: detecting an input; identifying an input range based on a location of the input; detecting a first path associated with additional input that is performed at least partially in the input range and displaying an indication of the first path on a touch screen display; comparing the first path to a second path; and performing a function in response to detecting that the first path matches the second path.

A non-transitory computer-readable medium is provided that stores one or more processor-executable instructions, which when executed by at least one processor cause the at least one processor to execute a method comprising the steps of: detecting an input; identifying an input range based on a location of the input; detecting a first path associated with additional input that is performed in the input range and displaying an indication of the first path on a touch screen display; comparing the first path to a second path; and performing a function in response to detecting that the first path matches the second path.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
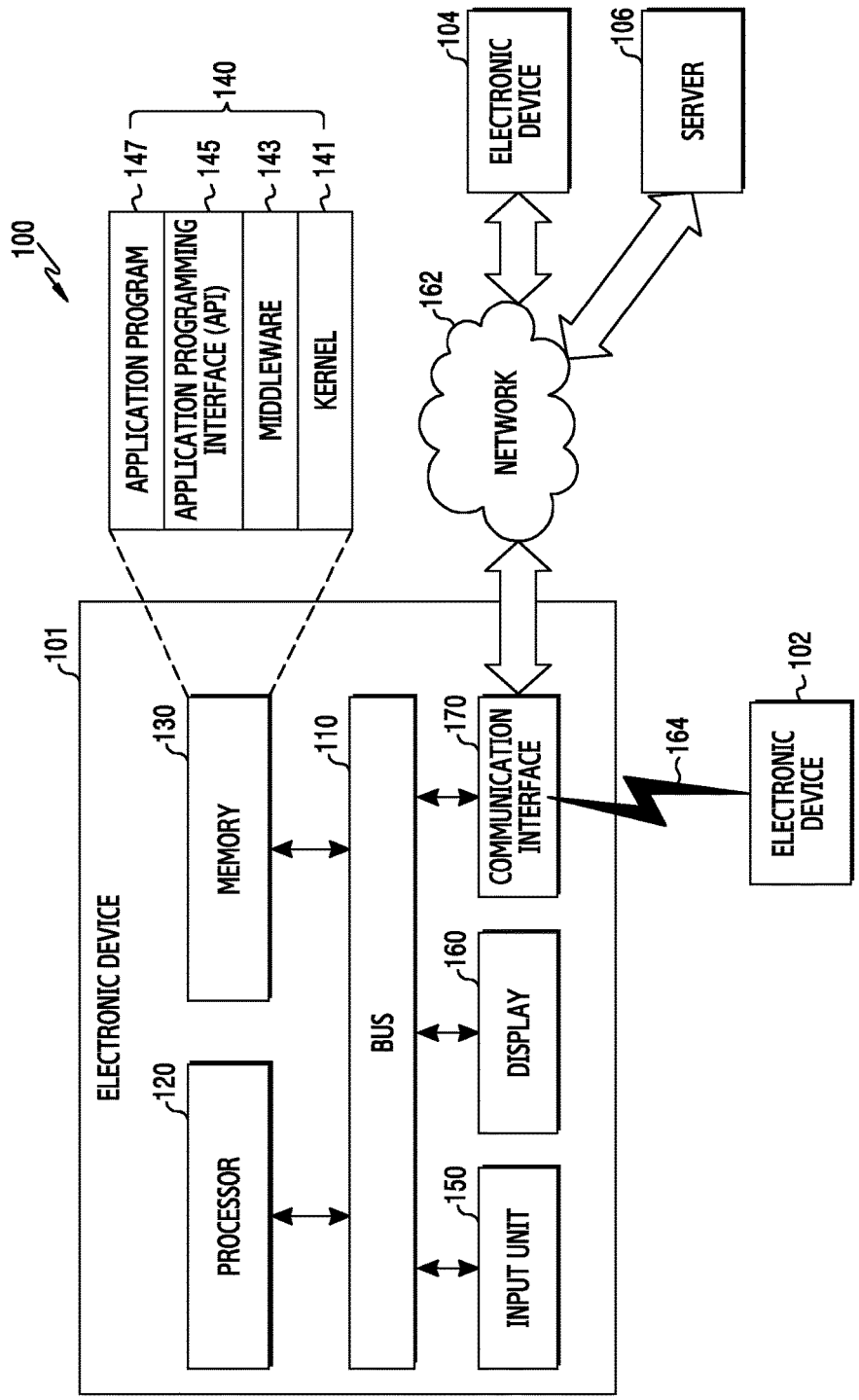
FIG. 1 is a diagram of an example of a network environment, according to various embodiments.

Hereinafter, embodiments of the present disclosure will be described in detail with reference to the accompanying drawings. Detailed descriptions of well-known functions and structures incorporated herein may be omitted to avoid obscuring the subject matter of the present disclosure. Further, the terms used herein are defined in consideration of functions of the present disclosure and may vary depending on a user's or an operator's intension and usage. Therefore, the terms used herein should be understood based on the descriptions made herein. In the present disclosure, an expression such as "A or B," "at least one of A or/and B," or "one or more of A or/and B" may include all possible combinations of together listed items. Expressions such as "first," "second," "primarily," or "secondary," used in various embodiments may represent various elements regardless of order and/or importance and do not limit corresponding elements. The expressions may be used for distinguishing one element from another element. When it is described that an element (such as a first element) is "(operatively or communicatively) coupled" to or "connected" to another element (such as a second element), the element can be directly connected to the other element or can be connected to the other element such as a third element).

An expression "configured to (or set)" used in the present disclosure may be replaced with, for example, "suitable for," "having the capacity to," "designed to," "adapted to," "made to," or "capable of" according to a situation. A term "configured to (or set)" does not always mean only "specifically designed to" by hardware. Alternatively, in some situation, an expression "apparatus configured to" may mean that the apparatus "can" operate together with another apparatus or component. For example, a phrase "a processor configured (or set) to perform A, B, and C" may be a generic-purpose processor (such as a Central Processing Unit (CPU) or an application processor) that can perform a corresponding operation by executing at least one software program stored at an exclusive processor (such as an embedded processor) for performing a corresponding operation or at a memory device.

An electronic device according to various embodiments of the present disclosure can include, for example, at least one of a smart phone, a tablet Personal Computer (PC), a mobile phone, a video phone, an e-book reader, a desktop PC, a laptop PC, a netbook computer, a workstation, a server, a Personal Digital Assistant (PDA), a Portable Multimedia Player (PMP), an MPEG 3 (MP3) player, a mobile medical equipment, a camera, and a wearable device. The wearable device can include at least one of an accessory type (e.g., a watch, a ring, a bracelet, an ankle bracelet, a necklace, glasses, a contact lens, or a Head-Mounted-Device (HMD)), a fabric or clothing embedded type (e.g., electronic garments), a body attachable type (e.g., a skin pad or a tattoo), and an implantable circuit. The electronic device can include at least one of, for example, a television, a Digital Video Disk (DVD) player, an audio device, a refrigerator, an air-conditioner, a cleaner, an oven, a microwave oven, a washing machine, an air cleaner, a set-top box, a home automation control panel, a security control panel, a media box (such as Samsung HomeSync™, Apple TV™, or Google TV™), a game console (such as Xbox™, PlayStation™), an electronic dictionary, an electronic key, a camcorder, and an electronic frame.

In another embodiment, the electronic device can include at least one of various medical devices (such as various portable medical measuring devices (a blood sugar measuring device, a heartbeat measuring device, a blood pressure measuring device, or a body temperature measuring device), a Magnetic Resonance Angiography (MRA) device, a Magnetic Resonance Imaging (MRI) device, a Computed Tomography (CT) device, a scanning machine, and an ultrasonic wave device), a navigation device, a Global Navigation Satellite System (GNSS), an Event Data Recorder (EDR), a Flight Data recorder (FDR), a vehicle infotainment device, an electronic equipment for ship (such as a navigation device for ship and gyro compass), avionics, a security device, a head unit for a vehicle, an industrial or home robot, a drone, an Automatic Teller's Machine (ATM) of a financial institution, a point of sales (POS) of a store, and Internet of things (such as a bulb, various sensors, a sprinkler device, a fire alarm, a thermostat, a street light, a toaster, a sports equipment, a hot water tank, a heater, and a boiler). According to an embodiment, the electronic device can include at least one of a portion of furniture, building/construction or vehicle, an electronic board, an electronic signature receiving device, a projector, and various measuring devices (such as water supply, electricity, gas, or electric wave measuring device). An electronic device according to an embodiment is a flexible electronic device or a combination of two or more of the foregoing various devices. An electronic device according to an embodiment of the present disclosure is not limited to the foregoing devices and includes a new electronic device according to technical development. In this specification, the term "user" can refer to a person using an electronic device or a device using an electronic device (e.g., an electronic device that uses artificial intelligence).

FIG. 1 is a diagram of an example of a network environment, according to various embodiments. Referring to FIG. 1, an electronic device 101 resides in a network 100. The electronic device 101 can include a bus 110, a processor 120, a memory 130, an input unit 150, a display 160, and a communication interface 170. The electronic device 101 can omit at least one of the components or further include another component. The bus 110 can include a circuit for connecting the components 110 to 170 and delivering communication signals (e.g., control messages or data) therebetween.

The processor 120 may include a microprocessor or any suitable type of processing circuitry, such as one or more general-purpose processors (e.g., ARM-based processors), a Digital Signal Processor (DSP), a Programmable Logic Device (PLD), an Application-Specific Integrated Circuit (ASIC), a Field-Programmable Gate Array (FPGA), a Graphical Processing Unit (GPU), a video card controller, etc. For example, the processor 120 can include one or more of a central processing unit, an application processor, and a Communication Processor (CP). The processor 120, for example, can perform an operation or data processing on control and/or communication of at least another component of the electronic device 101.

The memory 130 may include any suitable type of volatile or non-volatile memory, such as Random-access Memory (RAM), Read-Only Memory (ROM), Network Accessible Storage (NAS), cloud storage, a Solid State Drive (SSD), etc. The memory 130, for example, can store commands or data relating to at least another component of the electronic device 101. According to an embodiment, the memory 130 can store software and/or a program 140. The program 140, for example, can include a kernel 141, middleware 143, an Application Programming Interface (API) 145, and/or an application program (or "application") 147. At least part of the kernel 141, the middleware 143, or the API 145 can be called an Operating System (OS). The kernel 141 can control or manage system resources (e.g., the bus 110, the processor 120, or the memory 130) used for performing operations or functions implemented by the other programs (e.g., the middleware 134, the API 145, or the application program 147). Additionally, the kernel 141 can provide an interface for controlling or managing system resources by accessing an individual component of the electronic device 101 from the middleware 143, the API 145, or the application program 147.

The middleware 143, for example, can serve as an intermediary role for exchanging data between the API 145 or the application program 147 and the kernel 141 through communication. Additionally, the middleware 132 can process one or more job requests received from the application program 147, based on their priority. For example, the middleware 143 can assign a priority for using a system resource (e.g., the bus 110, the processor 120, or the memory 130) of the electronic device 101 to at least one of the application programs 147, and process the one or more job requests. The API 145, as an interface through which the application 147 controls a function provided by the kernel 141 or the middleware 143, can include, for example, at least one interface or function (e.g., an instruction) for file control, window control, image processing, or character control.

The input unit 150 may recognize a user's input. The input unit 150 may be a touch input unit. In addition, the input unit 150 may be an input/output interface including an output unit. The input/output interface may serve as an interface for delivering a command or data which is inputted from the user or another external device to the other element(s) of the electronic device 101. In addition, the input/output interface may output a command or data which is received from the other element(s) of the electronic device 101 to the user or another external device.

The display 160, for example, can include a Liquid Crystal Display (LCD), a Light Emitting Diode (LED) display, an Organic Light Emitting Diode (OLED) display, a MicroElectroMechanical Systems (MEMS) display, or an electronic paper display. The display 160, for example, can display various contents (e.g., texts, images, videos, icons, and/or symbols) to the user. The display 160 can include a touch screen, for example, and receive touch, gesture, proximity, or hovering inputs by using an electronic pen or a user's body part. The communication interface 170, for example, can set a communication between the electronic device 101 and an external device (e.g., a first external electronic device 102, a second external electronic device 104, or a server 106). For example, the communication interface 170 can communicate with the external device (e.g., the second external electronic device 104 or the server 106) over the network 162 through wireless communication or wired communication.

The wireless communication, for example, can at least one of Long Term Evolution (LTE), LTE-Advanced (LTE-A), Code Division Multiple Access (CDMA), Wideband CDMA (WCDMA), Universal Mobile Telecommunications System (UMTS), Wireless Broadband (WiBro), and Global System for Mobile Communications (GSM), as a cellular communication protocol. The wireless communication may include, for example, short-range communication 164. The short-range communication 164 may be conducted by, for example, at least one of WiFi®, Bluetooth®, Bluetooth Low Energy (BLE), Zigbee®, Near Field Communication (NFC), magnetic secure transmission, Radio Frequency (RF), and Body Area Network (BAN). The wireless communication can include GNSS. The GNSS can include, for example, Global Positioning System (GPS), Global Navigation Satellite System (GLONASS), BeiDou navigation satellite system (BeiDou), or Galileo (the European global satellite-based navigation system). Hereafter, the GPS can be interchangeably used with the GNSS. The wired communication, for example, can include at least one of Universal Serial Bus (USB), High Definition Multimedia Interface (HDMI), Recommended Standard 232 (RS-232), power line communications, and Plain Old Telephone Service (POTS). The network 162 can include at least one of telecommunications networks such as computer network (e.g., LAN or WAN), the Internet, and a telephone network.

Each of the first and second external electronic devices 102 and 104 can be the same or different type of the electronic device 101. According to various embodiments, all or part of operations executed in the electronic device 101 can be executed by another or a plurality of electronic devices (e.g., the electronic device 102 or 104 or the server 106). When the electronic device 101 is to perform a function or service automatically or at the request, instead of performing the function or the service by the electronic device 101 or additionally, the electronic device 101 can request at least part of a function relating thereto from another device (e.g., the electronic device 102 or 104, or the server 106). The other electronic device (e.g., the electronic device 102 or 104, or the server 106) can perform the requested function or an additional function and deliver its result to the electronic device 101. The electronic device 101 can provide the requested function or service by processing the received result as it is or additionally. For doing so, for example, cloud computing, distributed computing, or client-server computing techniques can be used.

Figure 2:
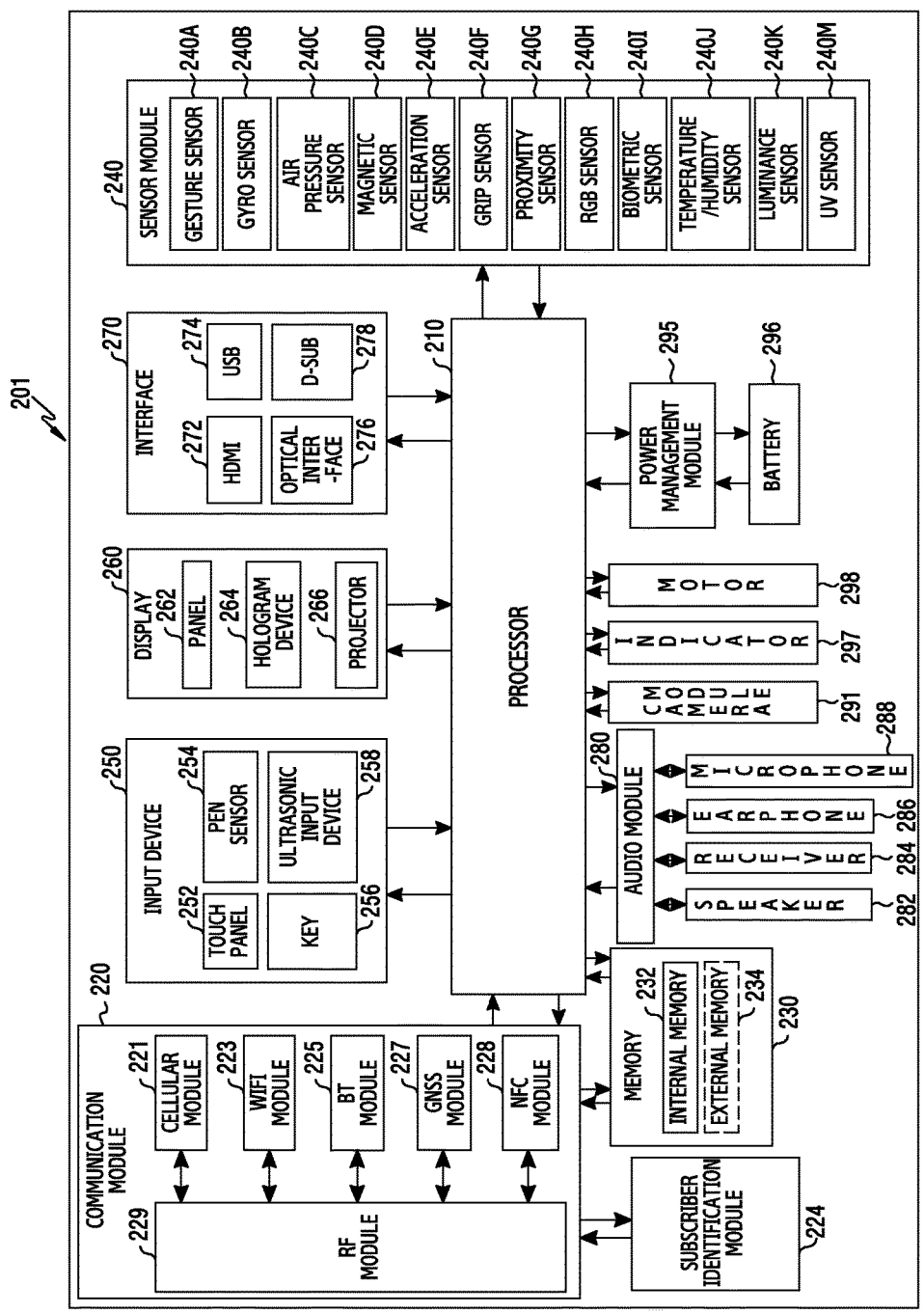
FIG. 2 is a diagram of an example of an electronic device, according to various embodiments.

FIG. 2 is a diagram of an example of an electronic device, according to various embodiments. FIG. 2 illustrates an electronic device 201 according to various embodiments of the present disclosure. The electronic device 201, for example, can include all or part of the above-mentioned electronic device 101 shown in FIG. 1. The electronic device 201 can include one or more processors (e.g., an Application Processor (AP) 210, a communication module 220, a Subscriber Identification Module (SIM) card 224, a memory 230, a sensor module 240, an input device 250, a display 260, an interface 270, an audio module 280, a camera module 291, a power management module 295, a battery 296, an indicator 297, and a motor 298. The processor 210, for example, can control a plurality of hardware or software components connected to the processor 210 and also perform various data processing and operations by executing an operating system or an application program. The processor 210 can be implemented with a System on Chip (SoC), for example. The processor 210 can further include a Graphic Processing Unit (GPU) and/or an image signal processor. The processor 210 can include at least part (e.g., a cellular module 221) of the components shown in FIG. 2. The processor 210 can load commands or data received from at least of other components (e.g., a nonvolatile memory) into a volatile memory, process them, and store various data in the nonvolatile memory.

The communication module 220 can have the same or similar configuration to the communication interface 170. The communication module 220 can include, for example, a cellular module 221, a WiFi® module 223, a Bluetooth® (BT) module 225, a GNSS module 227, an NFC module 228, and an RF module 229. The cellular module 221, for example, can provide voice call, video call, Short Message Service (SMS), or internet service through a communication network. The cellular module 221 can identify and authenticate the electronic device 201 in a communication network by using a subscriber identification module (e.g., the SIM card 224). The cellular module 221 can perform at least part of a function that the processor 210 provides. The cellular module 221 can further include a CP. At least part (e.g., two or more) of the WiFi® module 223, the BT module 225, the GNSS module 227, and the NFC module 228 can be included in one integrated chip (IC) or an IC package. The RF module 229, for example, can transmit/receive a communication signal (e.g., an RF signal). The RF module 229, for example, can include a transceiver, a Power Amp Module (PAM), a frequency filter, a Low Noise Amplifier (LNA), or an antenna. According to another embodiment, at least one of the cellular module 221, the WiFi® module 223, the BT module 225, the GNSS module 227, and the NFC module 228 can transmit/receive an RF signal through an additional RF module. The SIM card 224, for example, can include a card including a subscriber identification module or an embedded SIM, and also can contain unique identification information (e.g., an Integrated Circuit Card Identifier (ICCID)) or subscriber information (e.g., an International Mobile Subscriber Identity (IMSI)).

The memory 230 (e.g., the memory 130) can include an internal memory 232 or an external memory 234. The internal memory 232 can include at least one of, for example, a volatile memory (e.g., Dynamic RAM (DRAM), Static RAM (SRAM), or Synchronous Dynamic RAM (SDRAM)), and a non-volatile memory (e.g., One Time Programmable ROM (OTPROM), Programmable ROM (PROM), Erasable and Programmable ROM (EPROM), Electrically Erasable and Programmable ROM (EEPROM), mask ROM, flash ROM, flash memory, hard drive, and solid state drive (SSD)). The external memory 234 can include flash drive, for example, Compact Flash (CF), Secure Digital (SD), micro SD, mini SD, extreme digital (xD), Multi-Media Card (MMC), or memory stick. The external memory 234 can be functionally or physically connected to the electronic device 201 through various interfaces.

The sensor module 240 can, for example, measure physical quantities or detect an operating state of the electronic device 201, and thus convert the measured or detected information into electrical signals. The sensor module 240 can include at least one of a gesture sensor 240A, a gyro sensor 240B, an atmospheric pressure sensor 240C, a magnetic sensor 240D, an acceleration sensor 240E, a grip sensor 240F, a proximity sensor 240G, a color sensor 240H (e.g., a red, green, blue (RGB) sensor), a biometric sensor 240I, a temperature/humidity sensor 240J, an illumination sensor 240K, and an Ultra Violet (UV) sensor 240M. Additionally or alternatively, the sensor module 240 can include an E-nose sensor, an electromyography (EMG) sensor, an electroencephalogram (EEG) sensor, an electrocardiogram (ECG) sensor, an infra-red (IR) sensor, an iris sensor, and/or a fingerprint sensor. The sensor module 240 can further include a control circuit for controlling at least one sensor therein. The electronic device, as part of the processor 210 or individually, can further include a processor configured to control the sensor module 240 and thus control the sensor module 240 while the processor 210 is sleeping.

The input device 250 can include, for example, a touch panel 252, a (digital) pen sensor 254, a key 256, or an ultrasonic input device 258. The touch panel 252 can use at least one of, for example, capacitive, resistive, infrared, and ultrasonic methods. Additionally, the touch panel 252 can further include a control circuit. The touch panel 252 can further include a tactile layer to provide a tactile response to a user. The (digital) pen sensor 254 can include, for example, part of a touch panel or a sheet for recognition. The key 256 can include, for example, a physical button, a touch key, an optical key, or a keypad. The ultrasonic input device 258 can detect ultrasonic waves from an input means through a microphone (e.g., a microphone 288) and check data corresponding to the detected ultrasonic waves.

The display 260 (e.g., the display 160) can include a panel 262, a hologram device 264, a projector 266, and/or a control circuit for controlling them. The panel 262 can be implemented to be flexible, transparent, or wearable, for example. The panel 262 and the touch panel 252 can be configured with one or more modules. The hologram device 264 can show three-dimensional images in the air by using the interference of light. The projector 266 can display an image by projecting light on a screen. The screen, for example, can be placed inside or outside the electronic device 201. The interface 270 can include a High-Definition Multimedia Interface (HDMI) 272, a Universal Serial Bus (USB) 274, an optical interface 276, or a D-subminiature (sub) 278, for example. The interface 270 can be included in the communication interface 170 of FIG. 1, for example. Additionally or alternatively, the interface 270 can include a Mobile High-Definition Link (MHL) interface, an SD card/MMC interface, or an Infrared Data Association (IrDA) standard interface.

The audio module 280, for example, can convert sound into electrical signals and convert electrical signals into sounds. At least some components of the audio module 280 can be included in the input unit 150 of FIG. 1, for example. The audio module 280 can process sound information inputted or outputted through a speaker 282, a receiver 284, an earphone 286, or the microphone 288. The camera module 291, as a device for capturing a still image and a video, can include one or more image sensors (e.g., a front sensor or a rear sensor), a lens, an Image Signal Processor (ISP), or a flash (e.g., an LED or a xenon lamp). The power management module 295, for example, can manage the power of the electronic device 201. According to an embodiment, the power management module 295 can include a Power Management IC (PMIC), a charger IC, or a battery or fuel gauge, for example. The PMIC can have a wired and/or wireless charging method. The wireless charging method can include, for example, a magnetic resonance method, a magnetic induction method, or an electromagnetic method, and can further include an additional circuit for wireless charging, for example, a coil loop, a resonant circuit, or a rectifier circuit. The battery gauge can measure the remaining amount of the battery 296, or a voltage, current, or temperature of the battery 296 during charging. The battery 296 can include, for example, a rechargeable battery and/or a solar battery.

The indicator 297 can display a specific state of the electronic device 201 or part thereof (e.g., the processor 210), for example, a booting state, a message state, or a charging state. The motor 298 can convert electrical signals into mechanical vibration and generate a vibration or haptic effect. The electronic device 201 can include a mobile TV supporting device (e.g., a GPU) for processing media data according to standards such as Digital Multimedia Broadcasting (DMB), Digital Video Broadcasting (DVB), or MediaFLO™. Each of the above-mentioned components of the electronic device can be configured with at least one component and the name of a corresponding component can vary according to the kind of an electronic device. In various embodiments, an electronic device (e.g., the electronic device 201) can be configured including at least one of the above-mentioned components or another component, or not including some of the above-mentioned components. Additionally, some of the components in an electronic device according to various embodiments of the present disclosure may be integrated together in a single entity, so that functions of previous corresponding components are performed identically.

Figure 3:
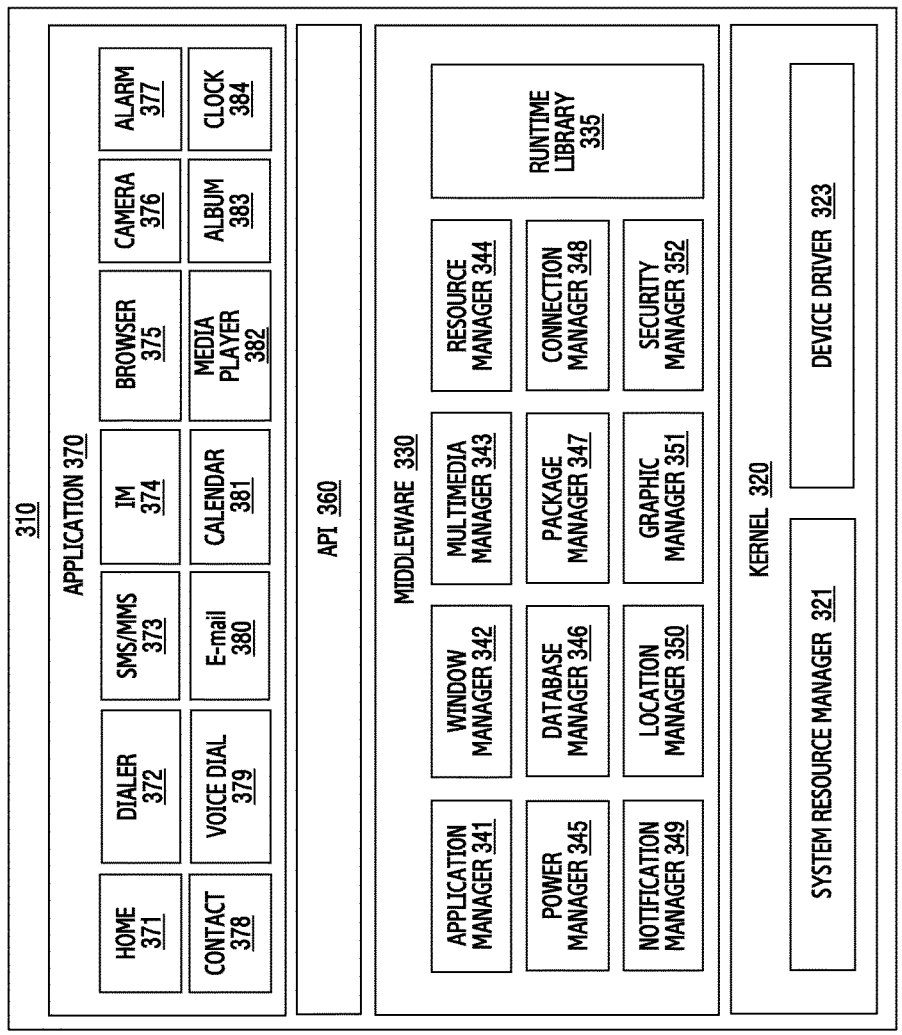
FIG. 3 is a diagram of an example of a program module, according to various embodiments.

FIG. 3 is a diagram of an example of a program module, according to various embodiments. The program module 310 (e.g., the program 140) can include an OS for controlling a resource relating to an electronic device (e.g., the electronic device 101) and/or various applications (e.g., the application program 147) running on the OS. The OS can include, for example, Android, iOS, Windows, Symbian, Tizen, or Samsung Bada. Referring to FIG. 3, the program module 310 can include a kernel 320 (e.g., the kernel 141), a middleware 330 (e.g., the middleware 143), an API 360 (e.g., the API 145), and/or an application 370 (e.g., the application program 147). At least part of the program module 310 can be preloaded on an electronic device or can be downloaded from an external electronic device (e.g., the electronic devices 102 and 104, a server 106).

The kernel 320 can include, for example, a system resource manager 321 and/or a device driver 323. The system resource manager 321 can control, allocate, or retrieve a system resource. According to an embodiment, the system resource manager 321 can include a process management unit, a memory management unit, or a file system management unit. The device driver 323 can include, for example, a display driver, a camera driver, a Bluetooth driver, a sharing memory driver, a USB driver, a keypad driver, a WiFi driver, an audio driver, or an Inter-Process Communication (IPC) driver. The middleware 330, for example, can provide a function the application 370 utilizes commonly, or provide various functions to the application 370 through the API 360 in order to allow the application 370 to efficiently use a limited system resource inside the electronic device. The middleware 330 can include at least one of a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, or a security manager 352.

The runtime library 335 can include, for example, a library module used by a compiler to add a new function through a programming language while the application 370 is running. The runtime library 335 can manage input/output, manage memory, or process an arithmetic function. The application manager 341, for example, can manage the life cycle of the applications 370. The window manager 342 can manage a GUI resource used in a screen. The multimedia manager 343 can recognize a format for playing various media files and encode or decode a media file by using the codec in a corresponding format. The resource manager 344 can manage a source code of the application 370 or a memory space. The power manager 345 can manage the battery or power of the battery and provide power information for an operation of the electronic device. The power manager 345 can operate together with a Basic Input/Output System (BIOS). The database manager 346 can create, search, or modify a database used in the application 370. The package manager 347 can manage installation or updating of an application distributed in a package file format.

The connectivity manager 348 can manage, for example, a wireless connection. The notification manager 349 can provide an event such as incoming messages, appointments, and proximity alerts to the user. The location manager 350 can manage location information of an electronic device. The graphic manager 351 can manage a graphic effect to be provided to the user or a user interface relating thereto. The security manager 352 can provide, for example, system security or user authentication. The middleware 330 can include a telephony manager for managing a voice or video call function of the electronic device, or a middleware module for combining various functions of the above-mentioned components. The middleware 330 can provide a module specialized for each type of OS. The middleware 330 can dynamically delete part of the existing components or add new components. The API 360, as a set of API programming functions, can be provided as another configuration according to OS. For example, in Android or iOS, one API set can be provided for each platform. In Tizen, at least two API sets can be provided for each platform.

The application 370 can include, for example, a home 371, a dialer 372, an SMS/MMS 373, an Instant Message (IM) 374, a browser 375, a camera 376, an alarm 377, a contact 378, a voice dial 379, an e-mail 380, a calendar 381, a media player 382, an album 383, a watch 384, health care (e.g., measure an exercise amount or blood sugar), or environmental information (e.g., air pressure, humidity, or temperature information) provision application. The application 370 can include an information exchange application for supporting information exchange between the electronic device and an external electronic. The information exchange application can include, for example, a notification relay application for relaying specific information to the external device or a device management application for managing the external electronic device. For example, the notification relay application can relay notification information from another application of the electronic device to an external electronic device, or receive and forward notification information from an external electronic device to the user. The device management application, for example, can install, delete, or update a function (e.g., turn-on/turn-off of the external electronic device itself (or some components) or display brightness (or resolution) adjustment) of an external electronic device communicating with the electronic device, or an application operating in the external electronic device. The application 370 can include a specified application (e.g., a health care application of a mobile medical device) according to a property of the external electronic device. The application 370 can include an application received from an external electronic device. At least part of the program module 310 can be implemented (e.g., executed) in software, firmware, hardware (e.g., the processor 210), or a combination of at least two of them, and include a module, a program, a routine, a set of instructions, or a process for executing one or more functions.

The term "module" used in various embodiments of the present disclosure can imply a unit including hardware, software, and firmware or any suitable combination. The "module" can be interchangeably used with a term such as a unit, logic, a logical block, a component, a circuit, and the like. The "module" can be a minimum unit of an integral component or can be a part thereof. The "module" can be a minimum unit for performing one or more functions or may be a part thereof. The "module" can be mechanically or electrically implemented. For example, the "module" according to various embodiments of the present disclosure can include at least one of an Application-Specific Integrated Circuit (ASIC) chip, a Field-Programmable Gate Arrays (FPGAs), and a programmable-logic device, which are known or will be developed and which perform certain operations. At least some parts of a device (e.g., modules or functions thereof) or a method (e.g., operations) based on the various embodiments of the present disclosure can be implemented with an instruction stored in a non-transitory computer-readable storage medium (e.g., the memory 130) as a program module. When the instruction is executed by one or more processors (e.g., the processor 120), the one or more processors can perform a function corresponding to the instruction. The non-transitory computer readable recording medium can include, for example, a hard disk, a floppy disc, a magnetic medium (e.g., a magnetic tape), an optical storage medium (e.g., a Compact Disc-ROM (CD-ROM) or a DVD, a magnetic-optic medium (e.g., a floptical disc)), and an internal memory. The instruction can include code created by a compiler or code executable by an interpreter. The module or program module can further include at least one or more components among the aforementioned components, or can omit some of them, or can further include additional other components. Operations performed by a module, program module, or other components of the various embodiments of the present disclosure can be executed in a sequential, parallel, repetitive, or heuristic manner. In addition, some of the operations can be executed in a different order or may be omitted, or other operations may be added.

Various embodiments of the present disclosure relate to an electronic device (for example, including a function of setting security and unlocking a security-set lock state) and a method for operating thereof. According to various embodiments of the present disclosure, the electronic device which has a function of setting security and unlocking a security-set lock state does not hide a screen by a security input portion and can perform an input to unlock the lock state even when the security is set in the electronic device. According to various embodiments of the present disclosure, the electronic device may determine an input range for unlocking on an initial input location when unlocking the security-set lock state, and unlock the lock screen by tracking (e.g., detecting) inputs within the input range.

In various embodiments of the present disclosure, which will be described below, an electronic device, a wearable device, and a device are distinguished from one another for convenience of explanation. In this state, when the electronic device and the wearable device are connected with each other, an operation to be performed between the electronic device and the wearable device in association with a function corresponding to the device according to whether the device is connected to or disconnected from the electronic device will be explained. However, in various embodiments of the present disclosure, the wearable device and the device may be included in the range of the electronic device, and an interoperation performed between the electronic devices may be performed in various electronic devices as well as the wearable device and the device. For example, in various embodiments of the present disclosure, the electronic device may include all devices using one or more of various processors (for example, the processor 120, 210) such as an application processor (AP), a communication processor (CP), a graphic processing unit (GPU), a central processing unit (CPU), etc., like all information communication devices, multimedia devices, wearable devices, and application devices therefor, which support functions according to various embodiments of the present disclosure.

In various embodiments of the present disclosure which will be described below, a hardware-level approach method will be explained by way of an example. However, various embodiments of the present disclosure include technology using both hardware and software, and thus do not exclude software-based approach methods.

According to various embodiments of the present disclosure, an electronic device may include: an input unit; a display to display an input range; and a processor functionally connected to the input unit and the display, and the processor may recognize an input of the input unit, set an input range on a location of the recognized input, display an input path on the display, track (e.g., detect) the input path, compare the tracked path and a registered path, and, when the paths match each other, execute a set function.

The processor may display the input range with reference to the location of the recognized input on the display. The processor may display a lock screen on the display, and, when the input is recognized, may hide the lock screen and display the input range. The processor may display an input range in a security setting mode, and track a path which is inputted within the displayed input range and register the path as the registered path for unlocking. The processor may store an input path which is tracked through a first input range as a first registered path, store an input path which is tracked through a second input range as a second registered path, and, when the first registered path and the second registered path match each other, register as the registered path, and a display location of the first input range and a display location of the second input range may be different from each other. The processor may track (e.g., detect) an input order in the input range and store a tracked path according to the tracked input order. The input may include at least one of a horizontal input, a vertical input, a diagonal input, or overlapping inputs. The processor may track a path which is inputted within the input range, and adjust the input range according to progress of the input and the tracked path. The processor may display the input path on the display and control a degree of display of the input path according to the input order. When the tracked path matches the registered path, the processor may unlock the lock screen.

Figure 4:
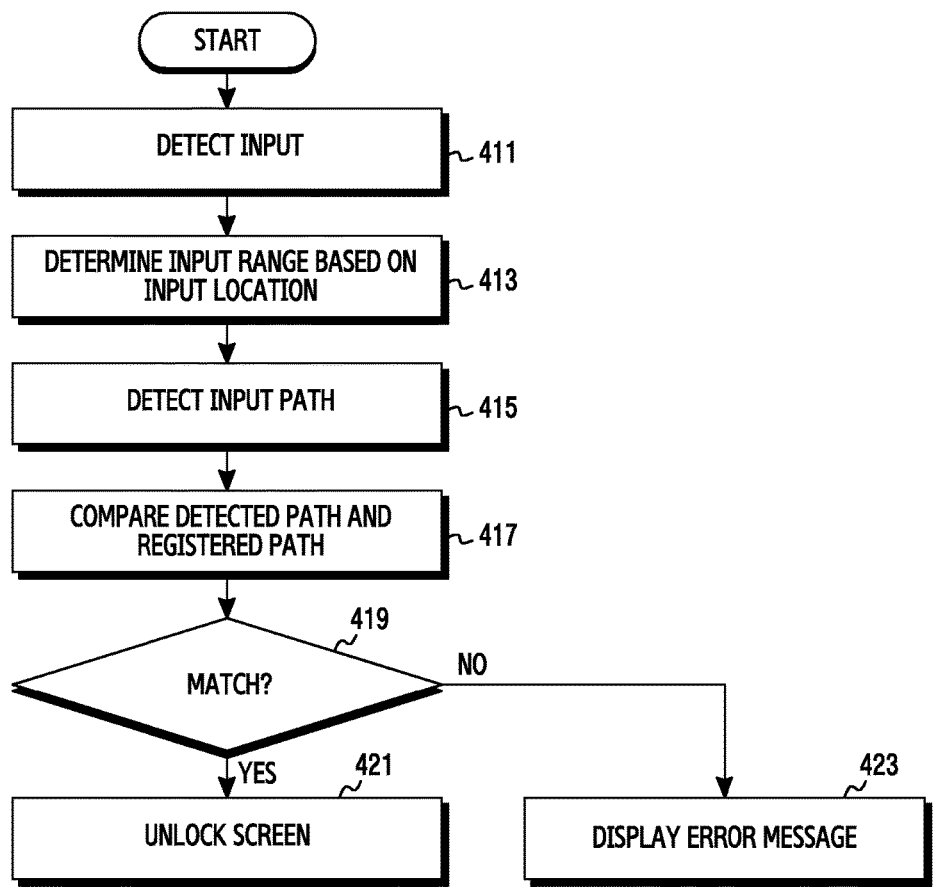
FIG. 4 is a flowchart of an example of a process, according to various embodiments of the present disclosure.

FIG. 4 is a flowchart of an example of a process, according to various embodiments of the present disclosure. Referring to FIG. 4, the processor 120 may turn off the screen of the display 160 in an idle state or a power-off state. In this state, when the user generates an input to turn on the electronic device, the processor 120 may supply power to the input unit 150 and the display 160, and display a screen (for example, wall paper) which is set on the display 160.

The screen displayed on the display 160 may be a lock screen that lacks a pattern input area for unlocking the electronic device 100.

When the user touches a certain location of the lock screen while the lock screen is being displayed, the processor 120 may detect the location of the input (e.g., touch input) through the input unit 150 in operation 411. When the input location is recognized, the processor 120 may hide the lock screen and display a screen for unlocking the lock state. In addition, the processor 120 may set an input range based on the detected input location in operation 413. Accordingly, the user may start an input for unlocking from the location where the touch input starts. When the user enters an input for unlocking, the processor 120 may display an input path on the display 160 and track (e.g., detect) and store the input path in operation 415.

In addition, when the input ends, the processor 120 may compare the tracked (e.g. detected) input path and a registered path in operation 417. In addition, when the tracked path and the registered path match each other, the processor 120 may recognize that the paths match each other in operation 419, and unlock the lock screen and perform a set function in operation 421. For example, the set function is displaying a home screen on the display 160 or displaying a screen of an application which had been executed before the screen was locked. However, when the tracked path and the registered path do not match each other, the processor 120 may recognize that the paths do not match each other in operation 419 and display an error message on the display 160 in operation 423. In addition, the processor 120 may display the lock screen on the display 160.

When unlocking the lock state, the electronic device may set the input range based on the location where the initial input is generated on the screen. In addition, when analyzing the input, the electronic device may use an order of inputs (footprint) which are generated within the input range, rather than an inputted pattern shape, as an input value for unlocking. Accordingly, the electronic device may allow overlapping (and/or intersecting) inputs which are generated within the input range, and the input may include a horizontal input, a vertical input, and a diagonal input, in view of the moving direction of the input. In addition, the processor 120 may recognize the input even when the input is a continuous or discontinuous input within the input range.

Figure 5:
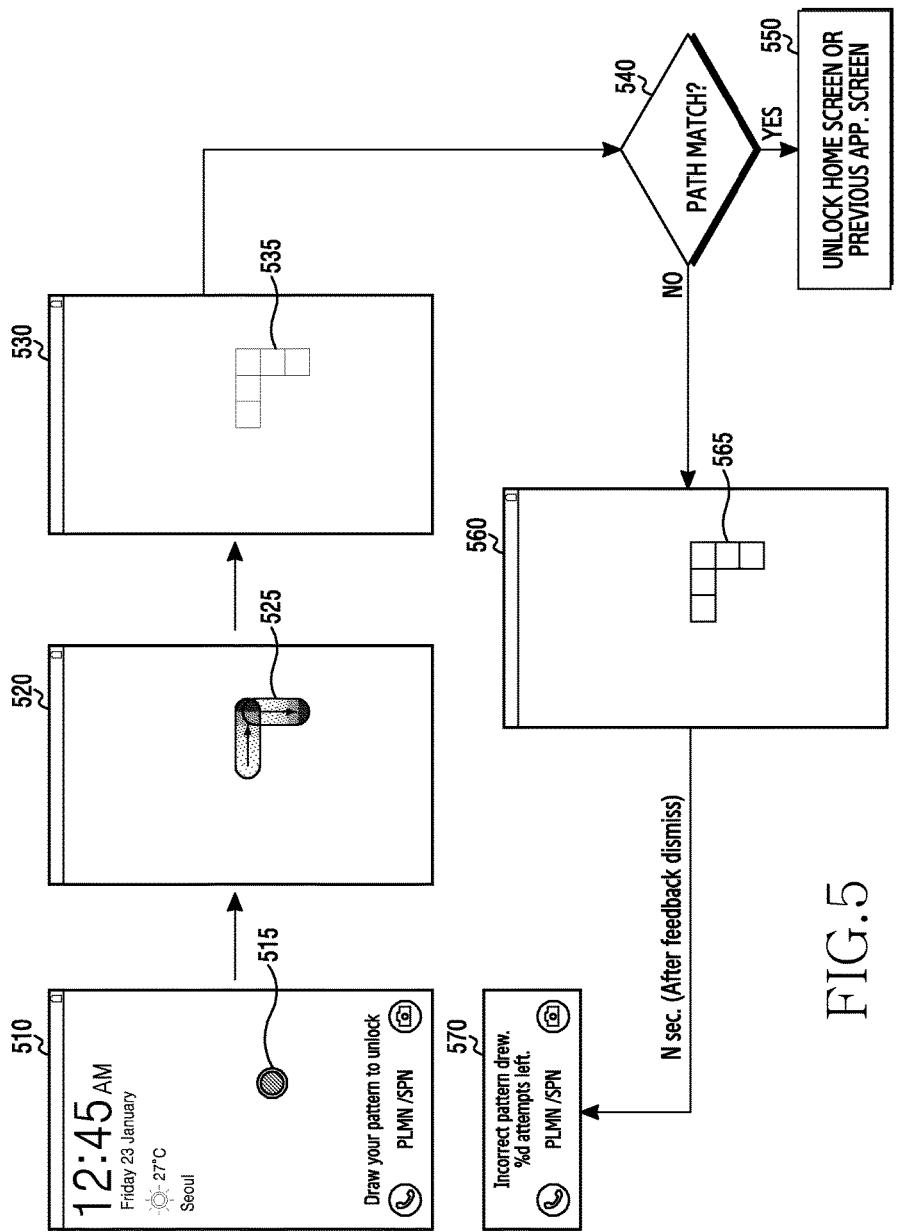
FIG. 5 is a diagram illustrating an example of a process for unlocking an electronic device, according to various embodiments of the present disclosure.

FIG. 5 is a diagram illustrating an example of a process for unlocking an electronic device, according to various embodiments of the present disclosure. Referring to FIG. 5, when the display 160 is turned on in a screen lock state, the processor 120 may display a lock screen on the display 160 in operation 510. In addition, when a touch input 515 is generated while the lock screen is being displayed, the processor 120 may recognize the touch input through the input unit 150 and display an indication of the location where the touch input is generated in operation 510. Thereafter, the processor 120 may hide the lock screen and may set an input range for receiving an unlocking input based the location of the touch input 515 in operation 520. For example, when the touch input is recognized while the lock screen is being displayed, the processor 120 may set the input range may be centered at the location where the touch input is recognized. Accordingly, the input for unlocking may be performed on any location of the screen.

Thereafter, when the touch input starts and the processor 120 detects an input 525 for unlocking in operation 520, the processor 120 may display an indication of an input path 535 in operation 530, and also, may store the input path 535. For example, when the input is continuously recognized, the processor 120 may track the input and store tracked path data representing the path defined by the input.

When the input for unlocking ends, the processor 120 may compare the input path 535 to a registered path in operation 540 and determine whether the two paths match. In this case, when the two paths match each other, the processor 120 may unlock the lock screen and display a home screen or a screen of an application which had been executed before the screen was locked on the display 160 in operation 550. However, when the two paths do not match each other, the processor 120 may display the lock screen and output an error message on the lock screen in operation 570. In this case, the displayed error notification may include an indication of the number unlocking attempts which can be performed afterwards.

Figure 6:
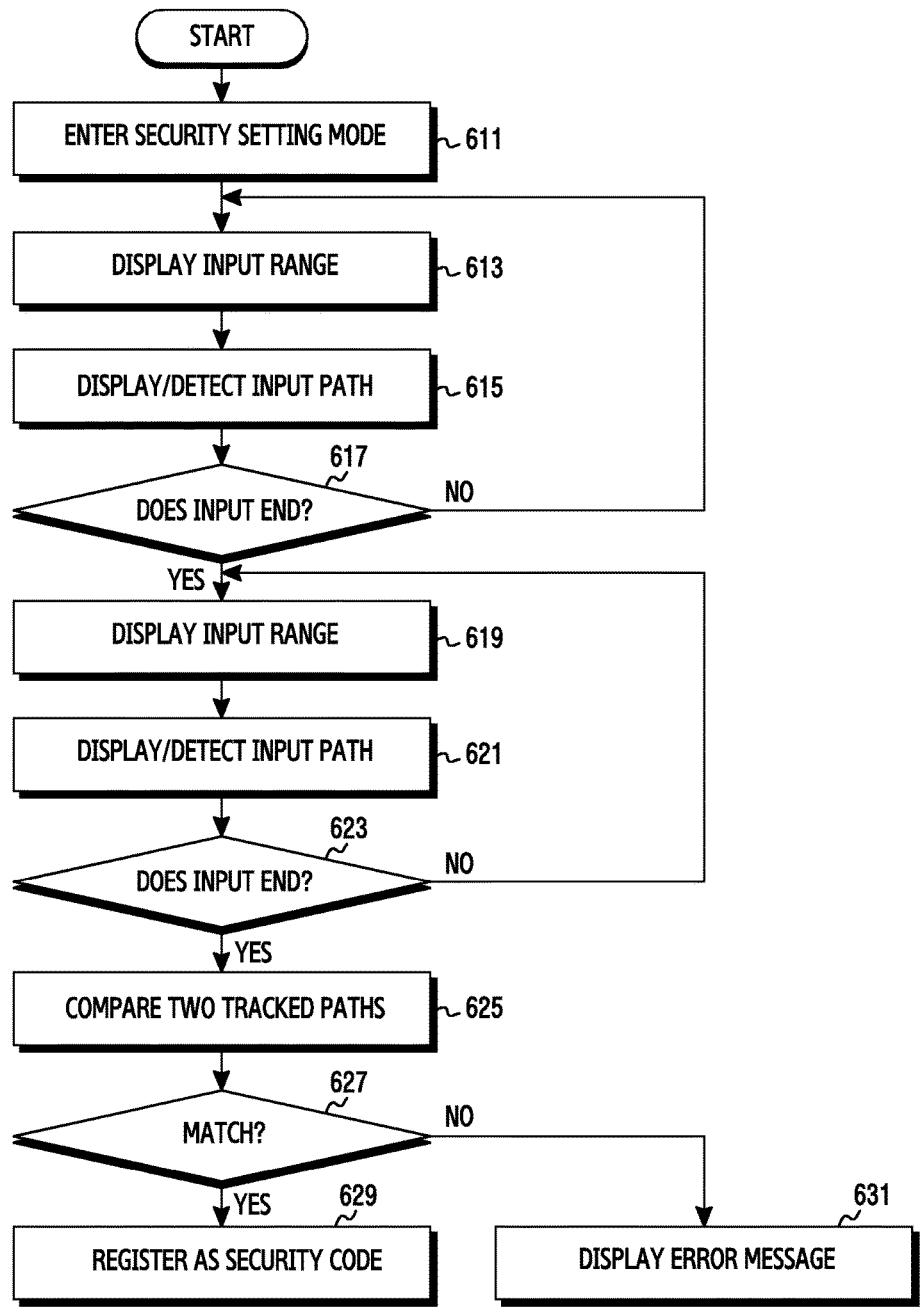
FIG. 6 is a flowchart of an example of a process, according to various embodiments of the present disclosure.

FIG. 6 is a flowchart of an example of a process, according to various embodiments of the present disclosure. Referring to FIG. 6, when security setting is requested through the input unit 150 (for example, when security setting is requested by selecting in order of settings, security, and pattern), the processor 120 may transition the electronic device into a security setting mode in operation 611.

Figure 7A:
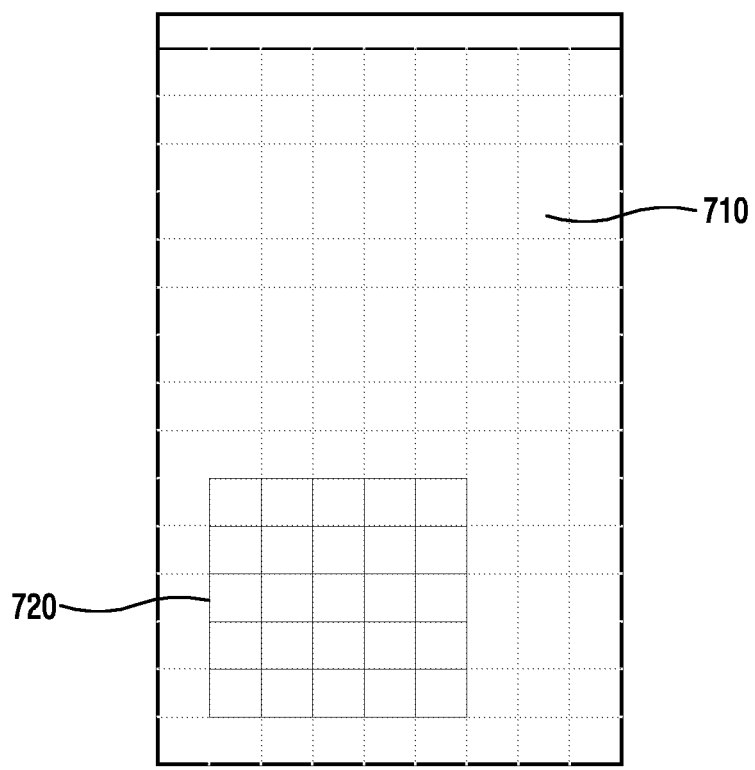
FIG. 7A is a diagram illustrating an example of an input range, according to various embodiments of the present disclosure.
Figure 7B:
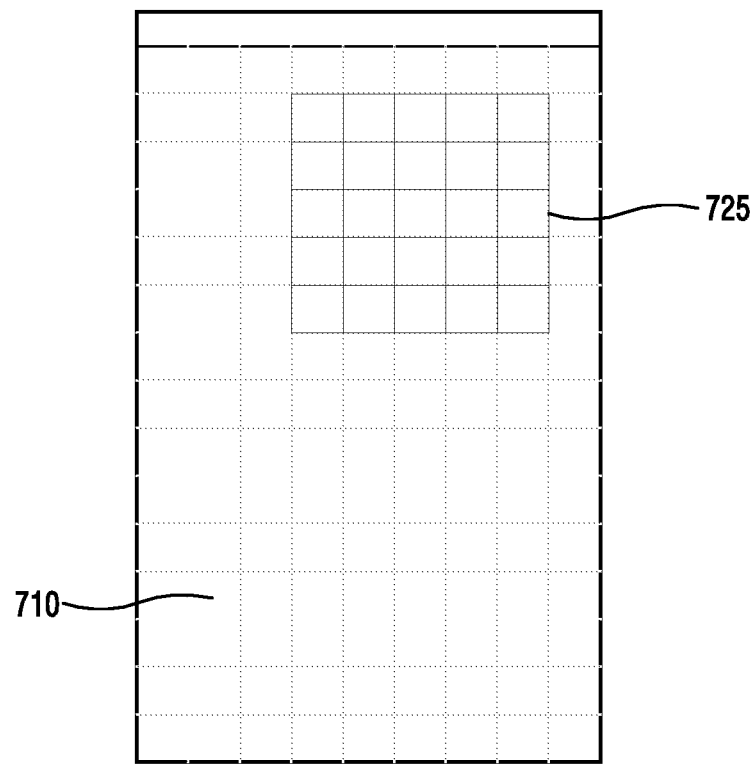
FIG. 7B is a diagram illustrating an example of an input range, according to various embodiments of the present disclosure.

FIGS. 7A and 7B are diagrams illustrating an example of an input range for registering unlocking information in an electronic device, according to various embodiments of the present disclosure. In operation 613, the processor 120 may display an input range 720 for inputting information for unlocking with reference to a user's touch input in a screen lock state on a predetermined location of a screen 710 on the display 160, as shown in FIG. 7A. The input range 720 may be represented by N*M blocks (or grids) (herein, N may be equal to or different from M). For example, the input range may be 5*5 blocks as shown in FIG. 7A. When the input range 720 is displayed as shown in FIG. 7A, the user may input desired unlocking information within the input range 720. In addition, the processor 120 may display a path of the inputted unlocking information on the display 160, track (e.g., detect) the input path, and store path data representing the input path in operation 615. For example, the stored input path may indicate information on an order of inputting by the user, and the input order information may be information on the blocks which are touched within the input range 720.

Figure 8A:
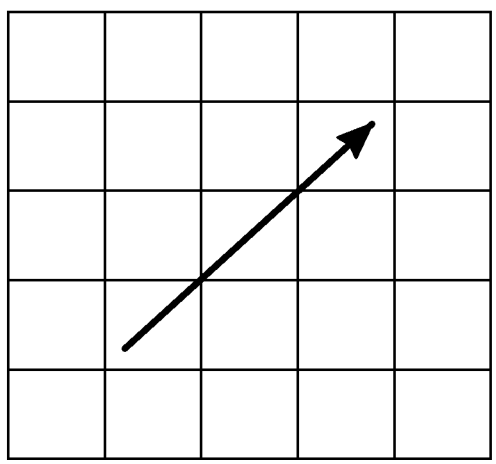
FIG. 8A is a diagram of an example of unlocking information, according to various embodiments of the present disclosure.
Figure 8B:
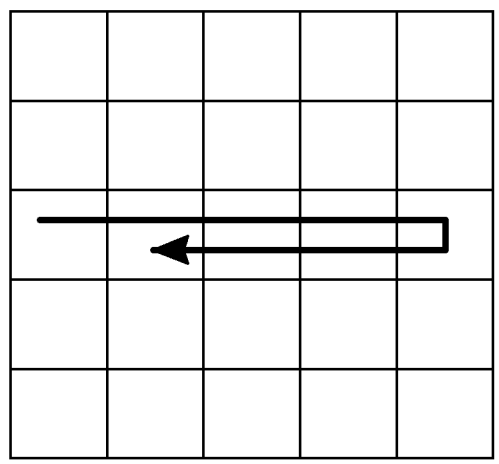
FIG. 8B is a diagram of an example of unlocking information, according to various embodiments of the present disclosure.
Figure 8C:
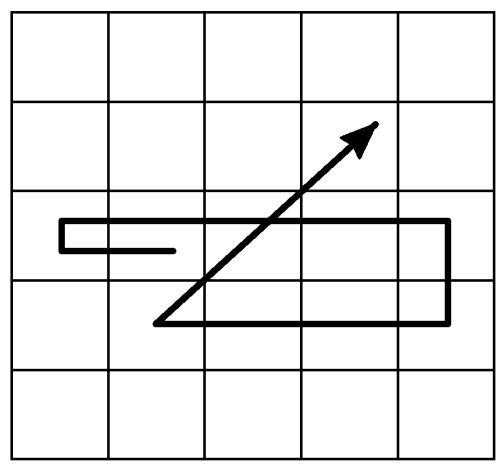
FIG. 8C is a diagram of an example of unlocking information, according to various embodiments of the present disclosure.

FIGS. 8A, 8B, 8C, 8D, and 8E are diagrams illustrating the operation of a process for inputting unlocking information in an electronic device, according to various embodiments of the present disclosure. The order of inputs generated within the input range may be registered as the unlocking information. Accordingly, the processor 120 may track the order of inputs performed by the user within the input range 720 (e.g., see FIG. 7A), and register the tracked path (which is defined by the input) as the unlocking information. For example, the input may include a vertical input or a horizontal input. In addition, the input may be a diagonal input as shown in FIG. 8A. Additionally or alternatively, the processor 120 may track path data from an initially touched block location to a finally touched block location, and register the tracked path data (input path) as the unlocking information. In addition, the input may include overlapping (e.g., intersecting) inputs as shown in FIG. 8C. When the overlapping (e.g., intersecting) inputs are recognized within the same block as shown in FIG. 8B, the processor 120 may track path data from the initially touched block location to the finally touched block location and register the path data (input path) tracked according to their order as the unlocking information. In addition, the input may be a mixture of a vertical input, a horizontal input, a diagonal input, and overlapping inputs as shown in FIG. 8C.

Figure 8D:
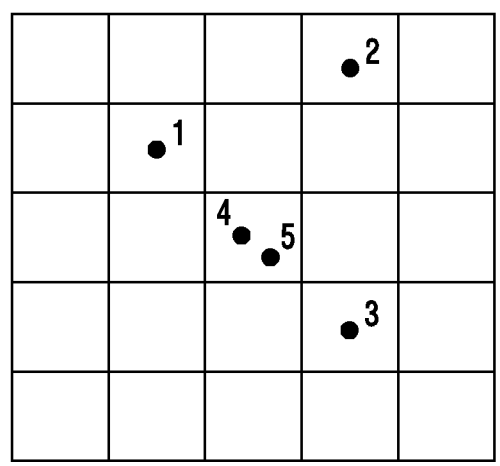
FIG. 8D is a diagram of an example of unlocking information, according to various embodiments of the present disclosure.
Figure 8E:
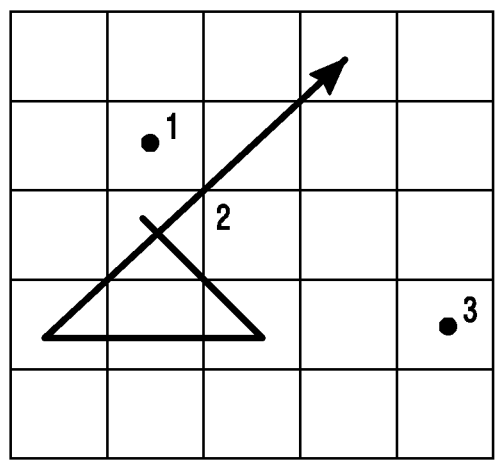
FIG. 8E is a diagram of an example of unlocking information, according to various embodiments of the present disclosure.

Additionally or alternatively, the input may include a plurality of discrete touches as shown in FIG. 8D. In such instances, the processor 120 may track the coordinates of the touches as the unlocking information. In this case, overlapping inputs may be generated in the intermittent input method. In addition, the input may be a mixture of an intermittent input and a continuous input (e.g., one or more sliding gestures) as shown in FIG. 8E.

To register the unlocking information as shown in FIGS. 8A-E, the electronic device may display the input range 720 on the display 160, track the order of inputs recognized within the input range 720, and register the tracked path data as the unlocking information. According to aspects of the disclosure, the path data may identify the order of different segments of the path and/or the blocks (e.g., cells) of the input range where the segments are located. The input method may include a vertical input, a horizontal input, a diagonal input, overlapping (e.g., intersecting) inputs, or a mixture thereof. In addition, the input method may include a continuous input, an intermittent input, or a mixed input (e.g., a mixture of a continuous input and an intermittent input). In addition, the processor 120 may track the order of recognizing inputs shown in FIGS. 8A-E, and store the order as a path data for unlocking. In addition, the path data may be adjusted by a predetermined number of blocks. For example, the path data for unlocking may be set to at least three blocks as shown in FIG. 8A and at most 12 blocks as shown in FIG. 8C.

Figure 9:
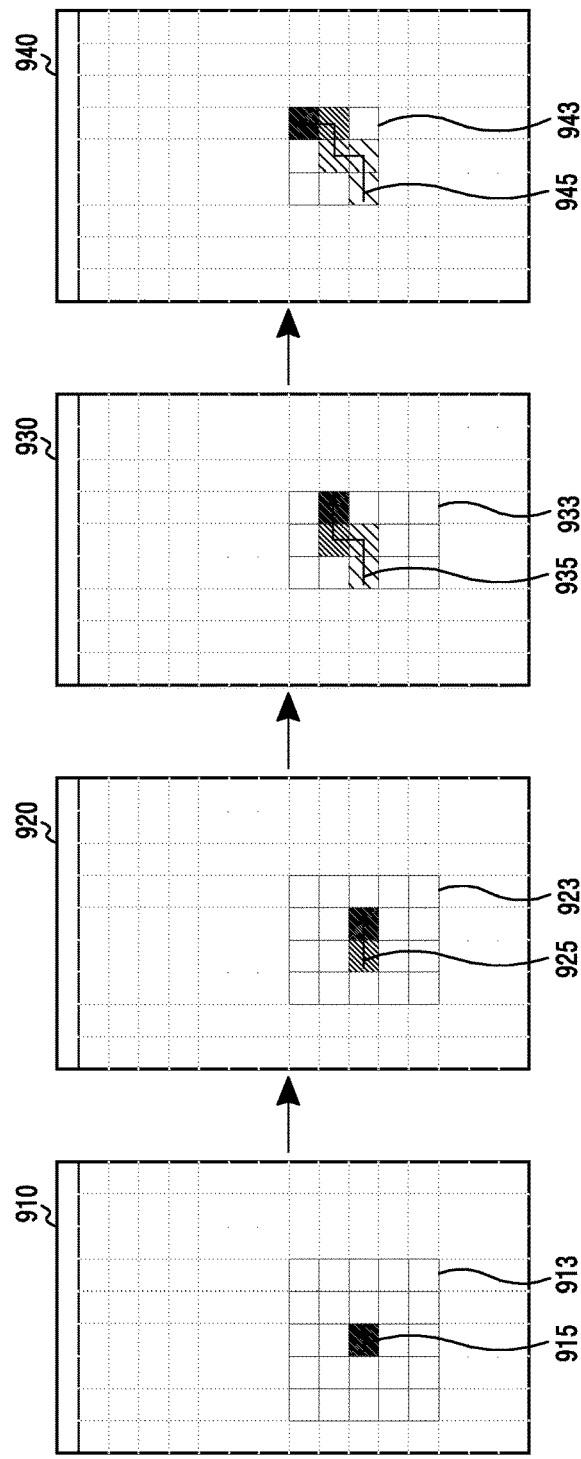
FIG. 9 is a diagram illustrating an example of a process for adjusting an input range, according to various embodiments of the present disclosure.

FIG. 9 is a diagram illustrating an example of a process for adjusting an input range, according to various embodiments of the present disclosure. Referring to FIG. 9, when an input does not end, the processor 120 may recognize that the input does not end in operation 617 and resume operation 613 In response. In such instances, the processor 120 may adjust the number of blocks of the input range 702 according to the progress of the input. For example, the processor 120 may transform the input range of 5*5 blocks to the input range of 3*3 blocks according to the progress of the input. When a horizontal input 915 is recognized while an input range 913 of 5*5 blocks is displayed on a screen 910, the processor 120 may display an input range 923 of 5*4 blocks by removing the left column blocks as shown on a screen 920. When a horizontal input 925 is recognized, the processor 120 may display an input range 933 of 5*3 blocks by removing the left column blocks as shown on a screen 930. In addition, when a vertical input 935 is generated while the input range of 5*3 blocks is being displayed, the processor 120 may transform the input range to an input range 943 of 3*3 blocks as shown on a screen 940, by removing the bottom row blocks. Thereafter, when the input range is transformed to the input range of 3*3 blocks, the processor 120 may not adjust the input range anymore and track the input path.

When the input path is tracked while adjusting the input range as described above, and an input of a different path is detected in deregistering, the input range may be wrongly adjusted and thus the input may not be generated anymore and an error may be notified. In various embodiments of the present disclosure, the input range is adjusted according to the progress of the input as shown in FIG. 9. However, the input range may not be adjusted. When the input range is not adjusted, the processor 120 may maintain the initially set input range (for example, 5*5 blocks).

In the state in which the input range is displayed as shown in FIG. 7A, the path for unlocking may be tracked, and, when the input ends, the processor 120 may recognize the end of the input in operation 617. Then, as shown in FIG. 7B, the processor 120 may display an input range 725 to identify the inputted path. In this case, when identifying the path, the processor 120 may display the input range 725 at a different location of the screen on which the input range 720 was displayed. This is to exactly set the path, and also to guide the user that the user is able to set the input range at a certain location of the screen to unlock.

The processor 120 may display the input range 725 in operation 619 as shown in FIG. 7B, and display and track (e.g., detect) a path which is inputted within the input range in operation 621. In addition, when the second path input ends, the processor 120 may recognize the end of the input in operation 623 and compare the two tracked paths in operation 625. In operation 627, the processor 120 may determine whether the two paths match each other. When the two paths match each other, the processor 120 may register the path data (representing one of the paths) as registered path data (security code) for unlocking in operation 629. However, when the two paths do not match each other, the processor 120 may display an error message and end the procedure in operation 631.

Figure 10:
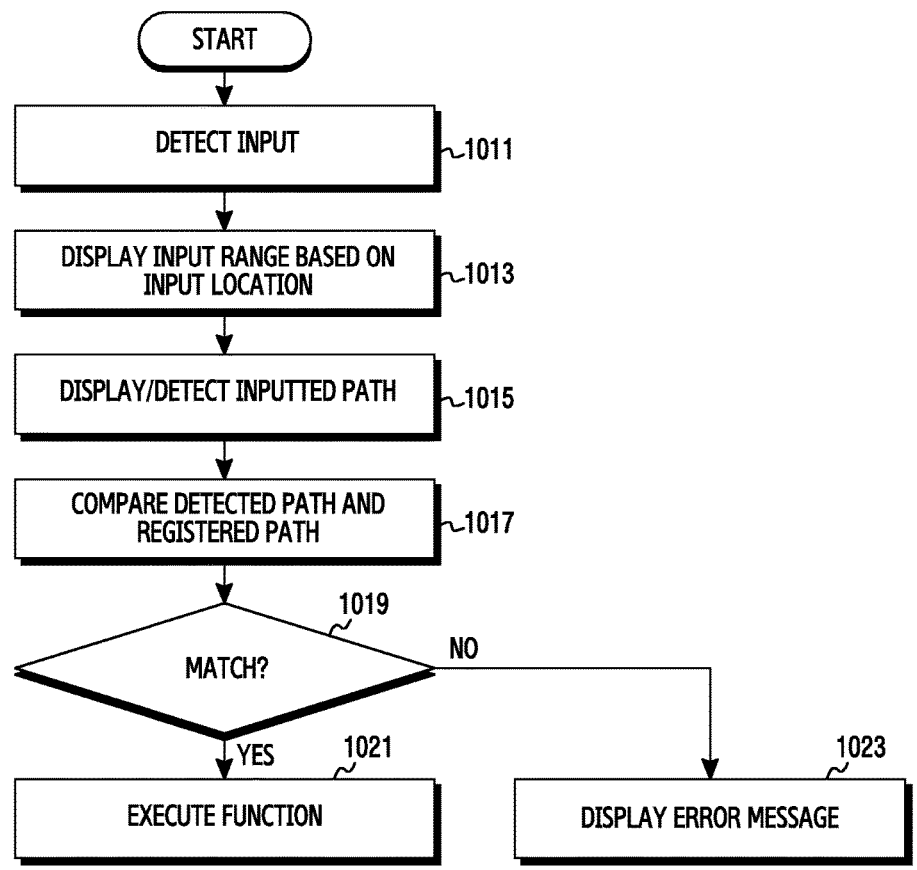
FIG. 10 is a flowchart of an example of a process, according to various embodiments of the present disclosure.

FIG. 10 is a flowchart of an example of a process, according to various embodiments of the present disclosure. Referring to FIG. 10, when the user turns on the electronic device, the processor 120 may supply power to the input unit 150 and the display 160, and display a lock screen on the display 160. In various embodiments of the present disclosure, the lock may lack a pattern input area for unlocking the screen lock state.

When the user touches a certain location of the lock screen while the lock screen is being displayed, the processor 120 may detect the location of the touch input through the input unit 150 in operation 1011. When the input location is recognized, the processor 120 may hide the lock screen and display an indication of the input range for unlocking the electronic device 100 in operation 1013. The input range may be an area for inputting information for unlocking in the screen lock state. The processor 120 may display an indication of the input range using an area which is formed of a plurality of blocks, and may display the input range in the form of a square of N*M (herein, N=M) or a rectangle of N*M (herein, N≠M). Herein, the processor 120 may set the input range with reference to the recognized input location. In other words, the indication of the input range may be a grid having a plurality of cells.

Accordingly, the processor 120 may not display the area for inputting unlocking information on a fixed area within the screen of the display 160, and display as an area having a set size at a location selected by the user. That is, since the processor 120 displays the input range on the location where the user generates a touch input, the user may generate an input for unlocking with one hand on a screen area desired by the user. In addition, since the processor 120 removes the display the lock screen when recognizing the touch input, the processor 120 may not cause a visual noise which hides the screen (wallpaper) on the display 160. In other words, because the location (and/or the size) of the input range is varied in accordance with the user touch, the indication of the input range may be displayed in a manner that does not obscure other information that is presented on In some implementations, the initial touch for displaying the input range and the additional input for unlocking the electronic device may be part of the same gesture (e.g., a sliding gesture). For example, the processor 120 may start an input for unlocking from a location where an initial touch input is performed. When the user enters the input for unlocking, the processor 120 may track (e.g., detect) an input path and display the tracked (e.g., detected) input path on the display 160 in operation 1015. For example, the processor 120 may track (e.g., detect) and store the order of different segments and/or input coordinates of the path. As explained above with reference to FIG. 6, the registered unlocking information may be registered as an ordered sequence of path segments, rather than a pattern shape. Accordingly, when information for deregistering is inputted, the user may input a path corresponding to the registered path. In this case, the input method may include a vertical input, a horizontal input, a diagonal input, and overlapping (or intersecting) inputs performed within the input range as shown in FIGS. 8A to 8E. In addition, the input method may be executed by an intermittent input, a continuous input or a mixture input method thereof. In addition, when a path has been registered while adjusting an input range in the method shown in FIG. 9, in operation 1015, the processor 120 may track an input path recognized within the input range while adjusting the input range at the same time.

When the input ends, the processor 120 may compare the tracked (e.g., detected) input path and the registered path in operation 1017. In addition, when the tracked path and the registered path are compared to each other, the processor 120 may determine whether the paths match each other in operation 1019. When the paths match each other, the processor 120 may unlock the screen and display a home screen on the display 160 or display a screen of an application which had been executed before the screen was locked in operation 1021. However, when the paths do not match each other, the processor 120 may display the lock screen on the display 160 along with an error message (for example, a message indicating a failure to unlock and/or the remaining number of times of unlocking operations, etc.) on the lock screen in operation 1023.

Figure 11A:
FIG. 11A is a diagram illustrating an example of a process for unlocking an electronic device, according to various embodiments of the present disclosure.
Figure 11B:
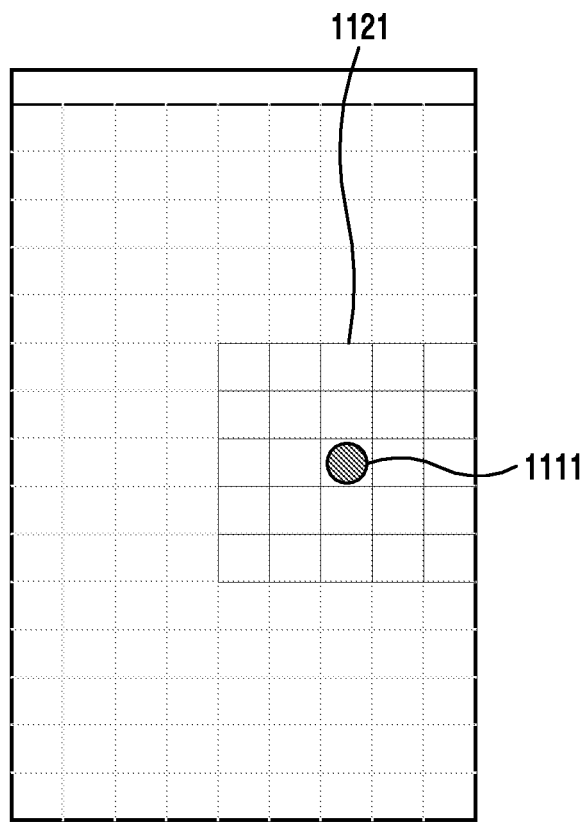
FIG. 11B is a diagram illustrating an example of a process for unlocking an electronic device, according to various embodiments of the present disclosure.

FIGS. 11A, 11B, 11C, and 11D are diagrams illustrating an example of a process for unlocking an electronic device, according to various embodiments of the present disclosure. Referring to FIGS. 11A-D, when the display 160 is turned on in a screen lock state, the processor 120 may display a lock screen on the display 160 as shown in FIG. 11A. When a touch input 1111 is generated while the lock screen is being displayed, the processor 120 may recognize the location where the touch input is generated. When the location of the touch input is recognized, the processor 120 may hide the lock screen and display an input range 1121 based on the location of the touch input 1111 as shown in FIG. 11B. The input range 1121 may be an area for inputting unlocking information. Since the input range 1121 is set on the location which is touched by the user, the input range 1121 may be set in any location of the screen. For example, the input range may be set at a location of the screen where the user can input the unlocking information with one hand. The input range 1121 may be formed of N*M blocks. The input range 1121 of FIG. 11B are formed of 5*5 blocks by way of an example.

Figure 11C:
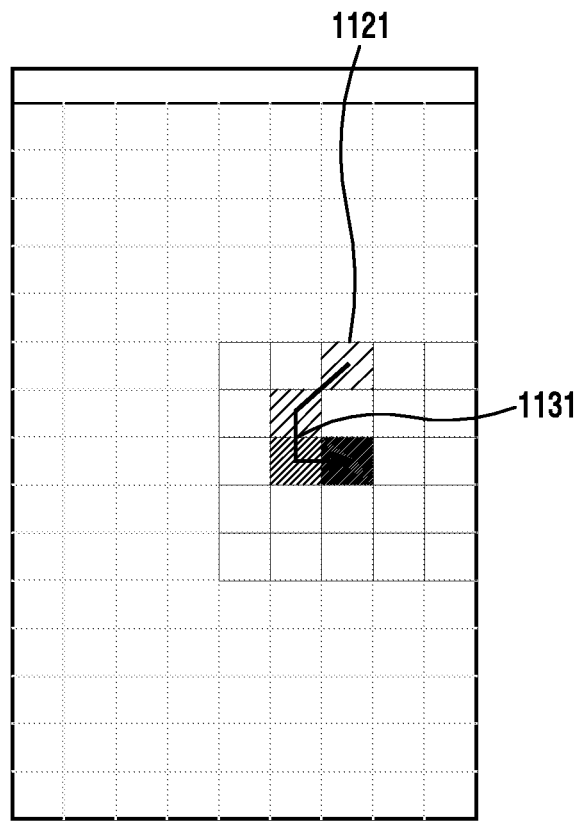
FIG. 11C is a diagram illustrating an example of a process for unlocking an electronic device, according to various embodiments of the present disclosure.
Figure 11D:
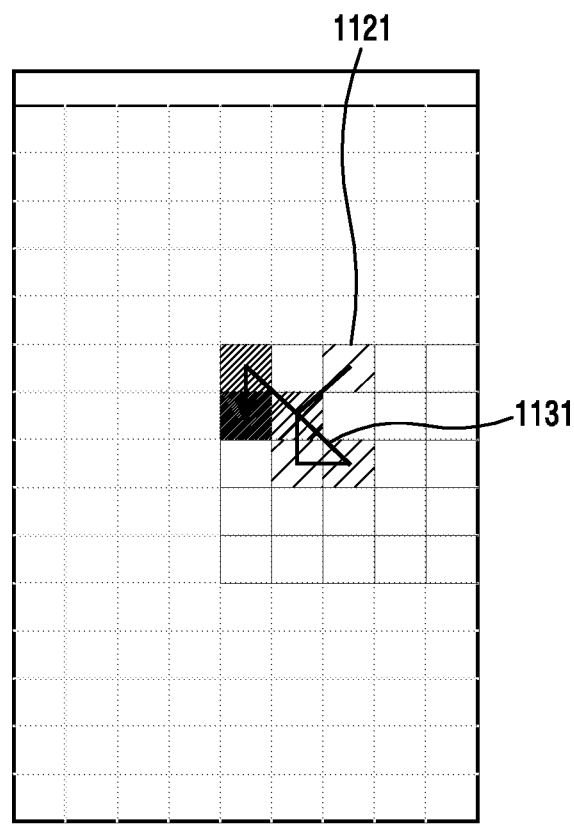
FIG. 11D is a diagram illustrating an example of a process for unlocking an electronic device, according to various embodiments of the present disclosure.

Thereafter, when a touch input starts within the input range 1121, the processor 120 may track an input order (e.g., of different portions so the input or different input coordinates) and display an input path 1131 as shown in FIG. 11C or 11D, and also, may store an input path data representing the input path. That is, when the touch input is recognized within the displayed input range, the processor 120 may track the recognized input orders and display the path. In such instances, the input path may be displayed by changing the depth of color, thereby indicating the input order. The input may be executed by a horizontal input, a vertical input, a diagonal input, overlapping inputs, or a mixture of two or more inputs. In addition, the input method may use an intermittent input, a continuous input, or a mixture input method of a continuous input and an intermittent input.

When the input for unlocking ends, the processor 120 may compare and analyze the input path tracked within the input range and a path which is registered by performing the procedure of FIG. 6, and, when the two paths match each other, the processor 120 may unlock the lock screen and display a home screen or a screen of an application which had been executed before the screen was locked.

Figure 12:
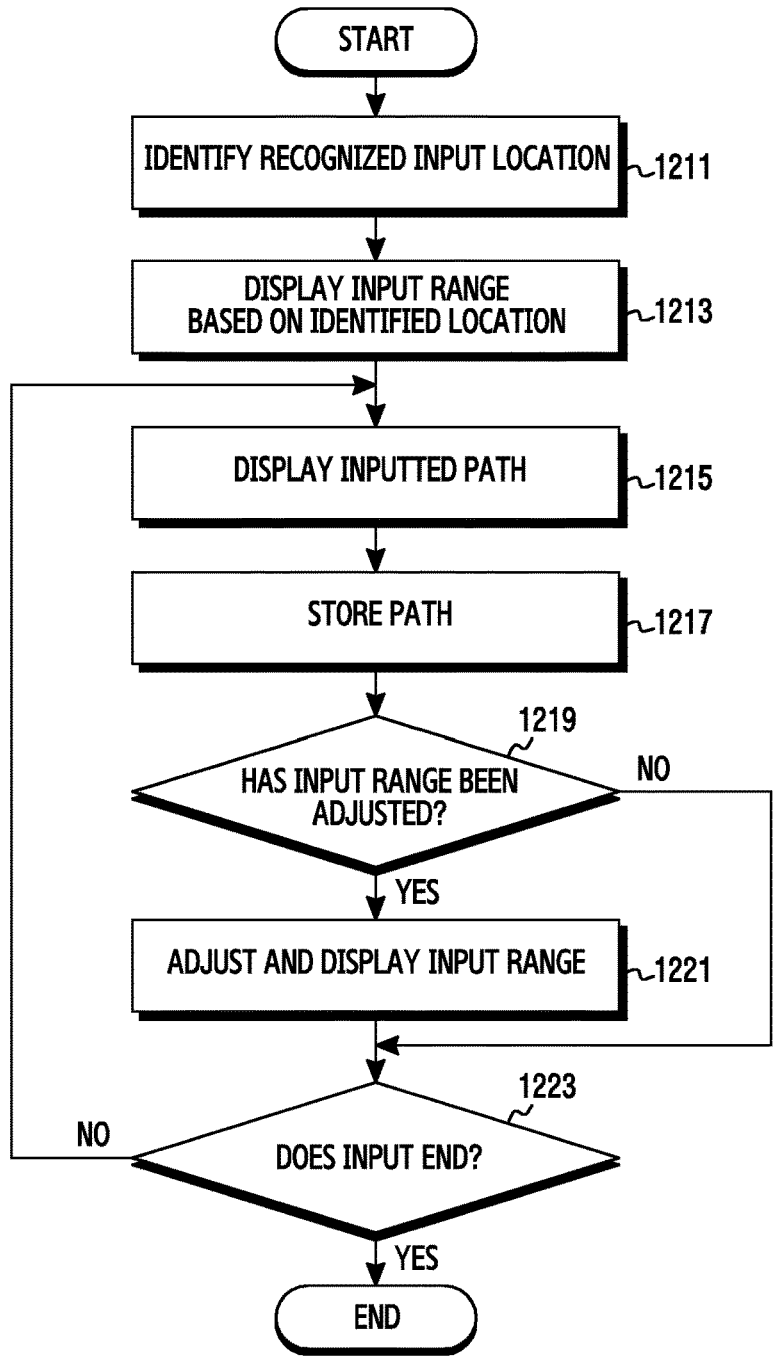
FIG. 12 is a flowchart of an example of a process, according to various embodiments of the present disclosure.

FIG. 12 is a flowchart of an example of a process, according to various embodiments of the present disclosure. Referring to FIG. 12, when a touch input is generated while a lock screen is being displayed on the display 160, the processor 120 may recognize a location where the touch input is generated in operation 1211. In operation 1213, when the input location is recognized, the processor 120 may display an input range based on the recognized location.

Figure 13A:
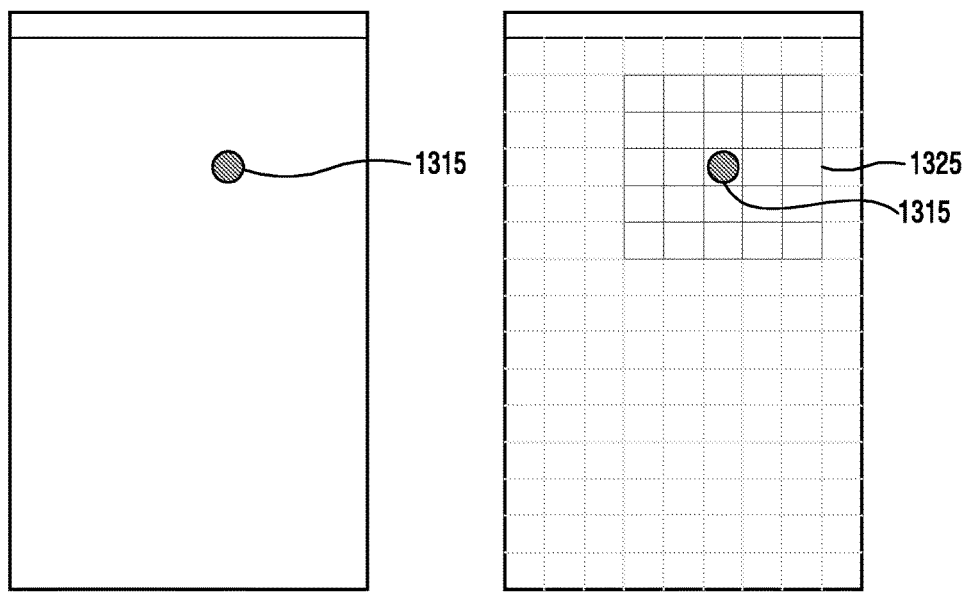
FIG. 13A is a diagram of an example of a process for displaying an input range, according to various embodiments of the present disclosure.
Figure 13B:
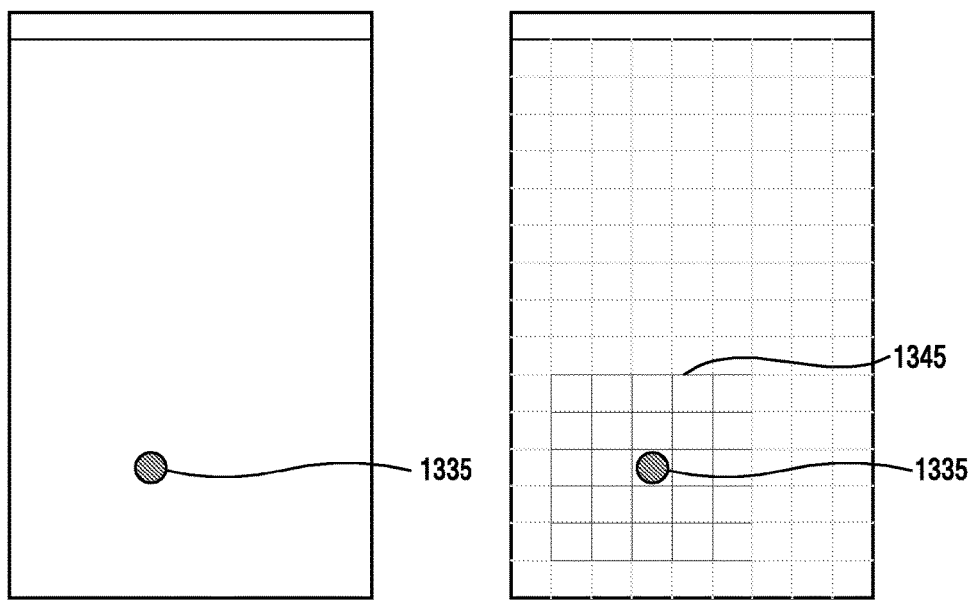
FIG. 13B is a diagram of an example of a process for displaying an input range, according to various embodiments of the present disclosure.

FIGS. 13A and 13B are diagrams illustrating examples of a process for displaying an input range according to an input location, according to various embodiments of the present disclosure.

Referring to FIG. 13A, when a touch input is recognized while a lock screen is being displayed, the processor 120 may display an input range with reference to a location where the touch input is recognized. For example, when a touch input 1315 is recognized on a right upper location of the screen as shown in FIG. 13A, the processor 120 may display an input range 1325 on the right upper end of the screen with reference to the location of the touch input 1315. In addition, when a touch input 1335 is recognized on a left lower location of the screen as shown in FIG. 13B, the processor 120 may display an input range 1345 on the left lower end of the screen with reference to the location of the touch input 1335. Accordingly, to unlock a lock state when the lock screen is displayed on the display 160, the processor 120 may recognize a location of an initial touch input, hide the lock screen, and display an indication of an input range having a predetermined size with reference to the recognized location. That is, when unlocking the lock screen, the user may input to unlock the screen on a certain area of the screen which is selected by the user. In this case, the user may unlock the lock state of the electronic device with one hand.

When the input range is displayed as shown in FIG. 13A or 13B, the processor 120 may track an input path recognized within the input range and display the input path on the display 160 in operation 1215.

Figure 13C:
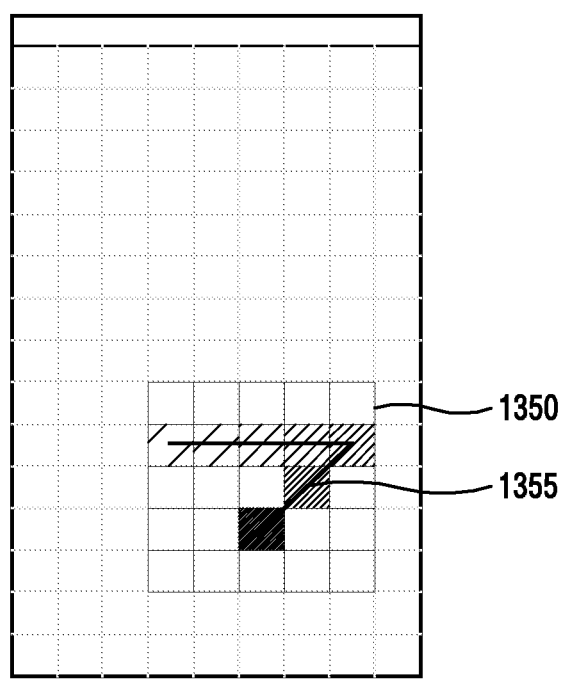
FIG. 13C is a diagram illustrating an example of a process for displaying an input path, according to various embodiments of the present disclosure.

FIG. 13C is a diagram illustrating an example of a process for displaying an input path, according to various embodiments of the present disclosure. Referring to FIG. 13C, the processor 120 may detect additional input that is performed in the input range (after the initial input that triggered the display of the input range) and display an input path 1355 that is defined by the additional input. The additional input may include a sliding gesture and/or a plurality of touches that are performed in the input range. By way of example, the sliding gesture may include any suitable type of gesture in which the user moves his or her finger across the input unit 150, such as a swipe, a drag, etc. Additionally or alternatively, the additional input may include a plurality of discrete touches that are performed in the input range.

In this case, the process of displaying the input path may display the input path by changing the depth of color (a gray level in the case of a monochrome input path) to highlight a recent input. For example, when the input path is displayed in a grey level, the degree of display of the path may be controlled differently by displaying a recent input in deep color and displaying an initial input in lightest color. In addition, the processor 120 may store path data of the input path 1315 of FIG. 13C in operation 1217. For example, when the input range has a block size of N*M, the input path data may identify the locations of blocks touched within the input range in sequence.

In addition, the number of blocks of the input range may be adjusted according to the progress of the input. For example, when the input range has been adjusted according to the progress of input in registering the unlocking information, the processor 120 may recognize that the input range has been adjusted in operation 1219, and display the input range by adjusting the blocks of the input range according to the progress of the input in operation 1221 as shown in FIG. 9. However, when the input range has not been adjusted (that is, when the input range of a fixed size has been used in registering the unlocking information), the processor 120 may recognize that the input range has not been adjusted in operation 1219 and may not adjust the input range.

After setting and displaying the input range, the processor 120 may track the path of the inputs recognized within the input range and store the path data obtained by tracking the path. In addition, when the end of the input is recognized, the processor 120 may recognize the end of the input in operation 1222 and return to operation 1017 of FIG. 10. According to various embodiments of the present disclosure, a method for operating an electronic device may include: recognizing a location of an input on a displayed lock screen; setting an input range for unlocking a screen lock on the recognized location; tracking a path of inputs which are recognized within the input range; and comparing the tracked path and a registered path, and, when the paths match each other, unlocking the screen lock.

The setting the input range may further include displaying the input range on the location of the input. The displaying the input range may include removing the display of the lock screen and displaying the input range. The method may further include registering the registration path, and the registering the registration path may include: displaying an input range in a security setting mode and tracking a path which is inputted within the displayed input range; and registering the tracked path as the registration path for unlocking. The tracking the path may include: storing an input path which is tracked through a first input range as a first registration path; and storing an input path which is tracked through a second input range as a second registration path, and the storing as the registration path may include, when the first registration path and the second registration path match each other, registering as the registration path, and the first input range and the second input range may be displayed at different locations. The tracking the path of the inputs may include tracking an input order in the input range, and storing path data according to the tracked input order as a tracked path. The input may include at least one of a horizontal input, a vertical input, a diagonal input, or overlapping inputs. The tracking the path of the inputs may further include tracking a path which is inputted within the input range, and adjusting the input range according to progress of the inputs and the tracked path. The tracking the path of the inputs may further include displaying the input path on the display and controlling a degree of display of the input path according to the input order. The method may further include, when the tracked path does not match the registration path, displaying the lock screen and displaying an unlocking error.

The electronic device and the method for operating thereof according to various embodiments of the present disclosure may perform an input for unlocking on any location of the screen according to user's selection when unlocking the lock state of the electronic device. In addition, even when the screen lock is set, the electronic device may display an input area for unlocking without hiding the screen (wall paper) (without causing a visual noise). In addition, when unlocking the screen, the electronic device may directly input to unlock on the lock screen without generating additional depth.

The above-described aspects of the present disclosure can be implemented in hardware, firmware or via the execution of software or computer code that can be stored in a recording medium such as a CD-ROM, a Digital Versatile Disc (DVD), a magnetic tape, a RAM, a floppy disk, a hard disk, or a magneto-optical disk or computer code downloaded over a network originally stored on a remote recording medium or a non-transitory machine-readable medium and to be stored on a local recording medium, so that the methods described herein can be rendered via such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein. In addition, it would be recognized that when a general purpose computer accesses code for implementing the processing shown herein, the execution of the code transforms the general purpose computer into a special purpose computer for executing the processing shown herein. Any of the functions and steps provided in the Figures may be implemented in hardware, software or a combination of both and may be performed in whole or in part within the programmed instructions of a computer. No claim element herein is to be construed under the provisions of 35 U.S.C. 112, sixth paragraph, unless the element is expressly recited using the phrase "means for". The terms "unit" or "module" referred to herein is to be understood as comprising hardware such as a processor or microprocessor configured for a certain desired functionality, or a non-transitory medium comprising machine executable code, in accordance with statutory subject matter under 35 U.S.C. § 101 and does not constitute software per se.

While the disclosure has been shown and described with reference to certain preferred embodiments thereof, it will be understood by those skilled in the art that various changes in form and details may be made therein without departing from the spirit and scope of the disclosure as defined by the appended claims. Therefore, the scope of the disclosure is defined not by the detailed description of the disclosure but by the appended claims, and all differences within the scope will be construed as being included in the present disclosure.

What is claimed is:

1. An electronic device comprising:
   a touch screen display; and
   at least one hardware processor operatively coupled to the touch screen display, configured to:
   display a lock screen in a first size;
   in response to detecting an input on the touch screen display, display an input range including a plurality of segments at a location of the touch screen display where the input is detected;

detect a first path associated with the detected input that is performed at least partially in the input range;

compare the first path to a second path stored in the electronic device; and perform a function in response to detecting that the first path matches the second path, wherein the input range is displayed in a second size smaller than the first size.

2. The electronic device of claim 1, wherein the first path is generated from the location of the detected input.

3. The electronic device of claim 1, wherein the at least one processor is further configured to hide the lock screen in response to the input.

4. The electronic device of claim 1, wherein the second path is registered while the electronic device is in a security setting mode, and performing the function includes unlocking the electronic device.

5. The electronic device of claim 4, wherein registering the second path includes:

detecting a first preliminary path that is associated with a first input performed in a first input range;

detecting a second preliminary path that is associated with a second input performed in a second input range, the second input range being different from the first input range; and registering one of the first preliminary path and the second preliminary path as the second path when the first preliminary path matches the second preliminary path.

6. The electronic device of claim 1, wherein detecting the first path includes detecting an order of at least two segments of the first path.

7. The electronic device of claim 1, wherein the first path comprises at least one of a horizontal segment, a vertical segment, a diagonal segment, or intersecting segments.

8. The electronic device of claim 1, wherein the at least one processor is further configured to adjust the input range while the detected input is being performed.

9. The electronic device of claim 1, wherein the at least one processor is further configured to control a degree of display of the first path according to tan order of at least two segments of the first path.

10. The electronic device of claim 1, wherein further comprising displaying the lock screen and displaying an error message when the first path does not match the second path.

11. A computer implemented method for use in an electronic device implemented using at least one hardware processor, the method comprising:

displaying a lock screen in a first size in response to detecting an input, displaying an input range including a plurality of segments at a location of a touch screen display where the input is detected;

detecting a first path associated with the detected input that is performed at least partially in the input range;

comparing the first path to a second path stored in the electronic device; and performing a function in response to detecting that the first path matches the second path, wherein the input range is displayed in a second size smaller than the first size.

12. The method of claim 11, wherein the first path is generated from the location of the detected input.

13. The method of claim 11, further comprising hiding the lock screen in response to the input.

14. The method of claim 11, wherein the second path is registered while the electronic device is in a security setting mode, and executing the function includes unlocking the electronic device.

15. The method of claim 14, wherein registering the second path includes:

detecting a first preliminary path that is associated with a first input performed in a first input range;

detecting a second preliminary path that is associated with a second input performed in a second input range, the second input range being different from the first input range; and registering one of the first preliminary path and the second preliminary path as the second path when the first preliminary path matches the second preliminary path.

16. The method of claim 11, wherein detecting the first path includes detecting an order of at least two segments of the first path.

17. The method of claim 11, wherein the first path comprises at least one of a horizontal segment, a vertical segment, a diagonal segment, or intersecting segments.

18. The method of claim 11, further comprising adjusting the input range while the detected input is being performed.

19. The method of claim 11, wherein displaying an indication of the first path on a touch screen display includes controlling a degree of display of the first path according to an order of at least two segments of the first path.

20. The method of claim 11, wherein the detected input includes at least one of a sliding gesture.

* * * * *